United States Patent [19]

Flocchini

[11] Patent Number: 5,140,942

[45] Date of Patent: Aug. 25, 1992

[54] PEN HAVING HIGH COW FLOW FOR AUTOMATED MILKING

[76] Inventor: Andrew J. Flocchini, 7078 Lakeville Hwy., Petaluma, Calif. 94952

[21] Appl. No.: 612,340

[22] Filed: Nov. 13, 1990

[51] Int. Cl.⁵ ............................................... A01J 3/00
[52] U.S. Cl. ................................................. 119/14.02
[58] Field of Search ............... 119/14.02, 14.03, 14.04, 119/27

[56] References Cited

U.S. PATENT DOCUMENTS

| | | | |
|---|---|---|---|
| 3,536,045 | 10/1970 | Flocchini | 119/14.03 |
| 4,241,699 | 12/1980 | Orchard | 119/14.03 |
| 4,419,961 | 12/1983 | Vandenberg et al. | 119/14.03 |
| 4,508,059 | 4/1985 | Anderson | 119/14.03 |

Primary Examiner—Gene Mancene
Assistant Examiner—Thomas Price
Attorney, Agent, or Firm—Townsend and Townsend

[57] ABSTRACT

In a milking barn having milking stalls disposed at an angle to the cow entry-exit path, an improved stall configuration is disclosed having parallel entry and exit paths for simultaneous entry and exit by individual cows. Each angularly disposed milking pen includes an overlying loading pen. The path between the loading pen and the milking pen spans across both the entrance and exit paths. The entrance path passes immediately adjacent the loading pen; a cow passing along the entrance path is diverted into and received into the loading pin by an open loading gate and confined by that same gate to the loading pen upon entrance. The exit path passes immediately adjacent the milking pens; a cow exiting from the milking pens along the exit path is permitted to pass to the exit path by an open milking pen gate. The entrance and exit paths in running parallel one to another are divided by overlapping gate matrices. A loading pen connects across the entrance and exit path to the milking pen by a temporarily defined crossing path defined by the open loading gate, the opened overlapping gates, and the opened milking gate. A backing wall backs the cow from the loading pen to the milking pen where the cow is captured for attachment of the teat cups to the bag. Only when such automated backing occurs is either the exit path or entrance path blocked; at all other times the paths are opened for the self-herding entrance and exit of cows.

7 Claims, 6 Drawing Sheets

OPERATOR WORK DIRECTION

PEN HAVING HIGH COW FLOW FOR AUTOMATED MILKING

BACKGROUND OF THE INVENTION

1. Field of the Invention

This invention relates to milking pens for cows. More particularly a milking pen arrangement is disclosed in which parallel entrance and exit paths are available for simultaneous entrance and exit of discrete animals permitting large cow flow for milking.

2. Brief Description of the Relevant Art

So-called herring bone configuration in milking barns are known. Typically, a path which is used for both entrance and exit of animals is utilized. The animals are disposed in milking pens which angularly extend and protrude into a lowered worker passageway. The pens expose the rear quarter of the cow for attachment of the teat cup. Thus the animal is disposed for milking in a position where movement of the worker may not be viewed and nervous animals needlessly excited.

Unfortunately, such herring bone barns require that the individual attendant herd the cows. Specifically, the cows must be individually herded into each of the stalls in preparation for milking.

In a previous patent entitled Automated Elevated Back-in Milking Barn, U.S. Pat. No. 3,536,045, issued Oct. 27, 1970, I have disclosed a back-in milking barn. In this patent I disclose a single entrance and exit path. This entrance and exit path extends between back-in milking stalls on one hand and front loading holding stalls on the other hand.

In the operative sequence therein disclosed, a milked cow departs the milking stall. A previously loaded cow in the loading pen is thereafter backed by automated apparatus to the milking stall. Such a barn while having automated herding unfortunately does not have the required cow flow. This being the case I disclose herewith an improvement.

SUMMARY OF THE INVENTION

In a milking barn having milking stalls disposed at an angle to the cow entry-exit path, an improved stall configuration is disclosed having parallel entry and exit paths for simultaneous entry and exit by individual cows. Each angularly disposed milking pen includes an overlying loading pen. The path between the loading pen and the milking pen spans across both the entrance and exit paths. The entrance path passes immediately adjacent the loading pen; a cow passing along the entrance path is diverted into and received into the loading pin by an open loading gate and confined by that same gate to the loading pen upon entrance. The exit path passes immediately adjacent the milking pens; a cow exiting from the milking pens along the exit path is permitted to pass to the exit path by an open milking pen gate. The entrance and exit paths in running parallel one to another are divided by overlapping gate matrices. A loading pen connects across the entrance and exit path to the milking pen by a temporarily defined crossing path defined by the open loading gate, the opened overlapping gates, and the opened milking gate. A backing wall backs the cow from the loading pen to the milking pen where the cow is captured for attachment of the teat cups to the bag. Only when such automated backing occurs is either the exit path or entrance path blocked; at all other times the paths are opened for the self-herding entrance and exit of cows.

Other objects, Features and Advantages

An object of this invention is to disclose a pen arrangement which permits complete self-herding of cows to be milked. Accordingly, separate and parallel entrance and exit paths are defined between loading pens and milking pens. Unmilked cows are free to enter the loading pens from a loading pen. Released and milked cows are free to exit the milking pens to a milked cow pen.

A further advantage of the disclosed milking pen is that in the event an unmilked cow fails to enter a loading path, a return path to the unmilked cow holding area is provided. Thus milked animals are held separate and apart from unmilked animals at all times. The chances of a cow passing through the pen apparatus in the unmilked state is virtually eliminated.

DETAILED DESCRIPTION OF THE DRAWINGS

Figure 1:
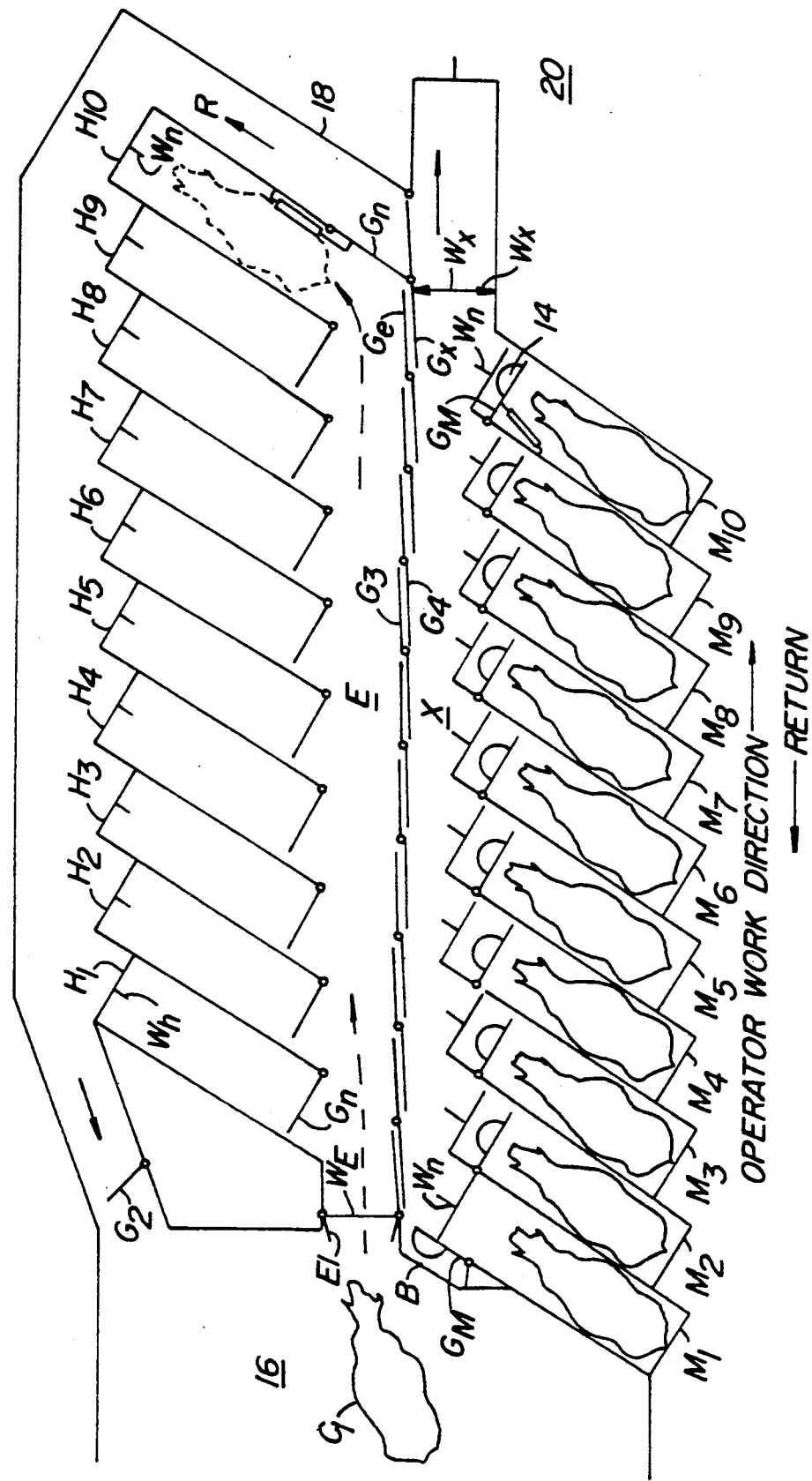
Figure 2:
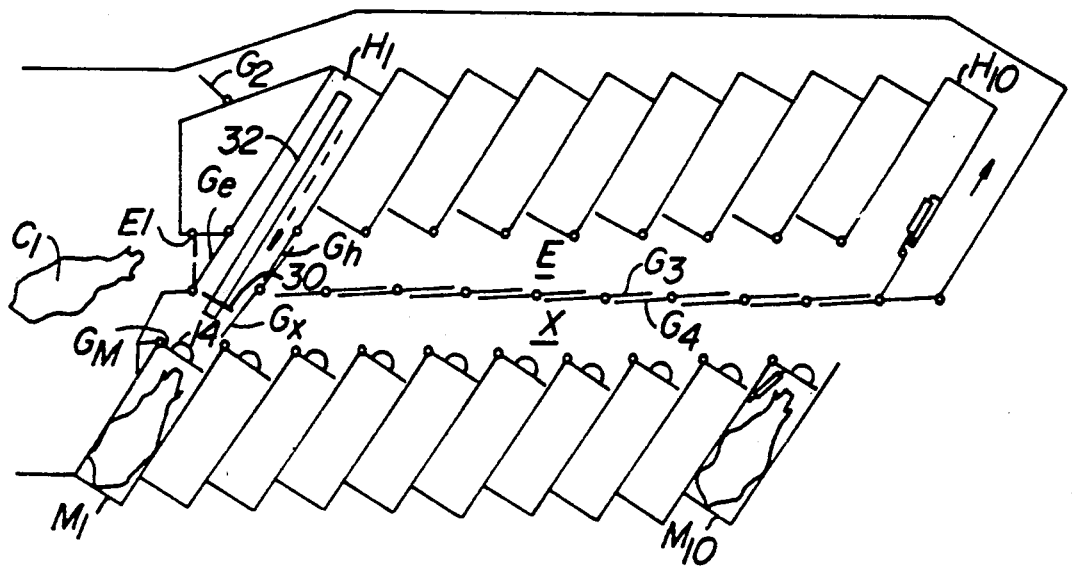
Figure 3:
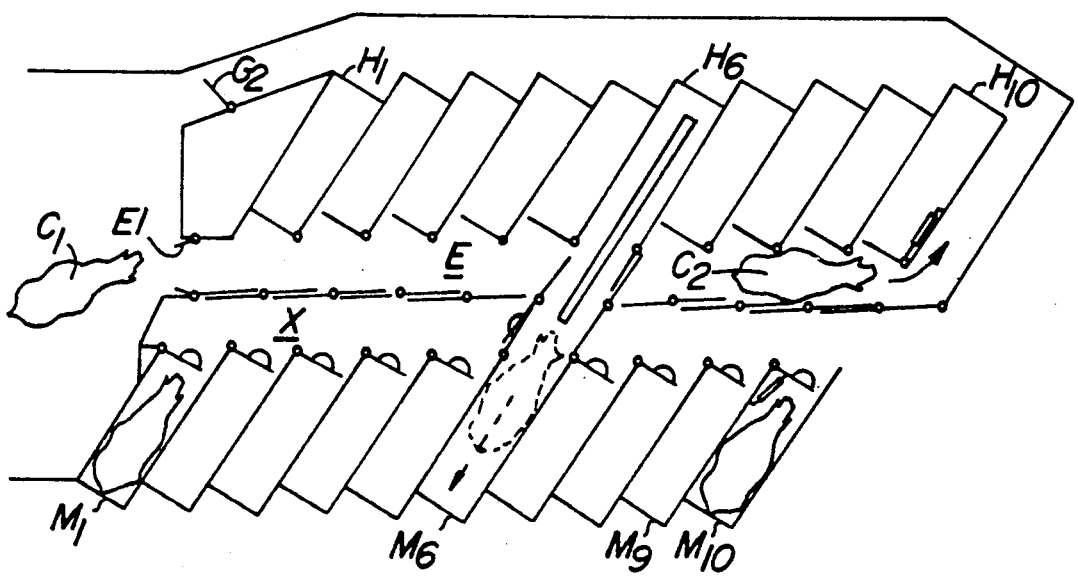

Other objects, features and advantages will become more apparent after referring to the following specification and attached drawings in which:

FIG. 1 is a plan view of the cow pen of my invention illustrating a first cow being loaded to a holding pen, a milked cow exiting from a milking pen with both cows passing at the same time along discrete and parallel entrance and exit paths;

FIG. 2 is a view similar to FIG. 1 illustrating the backing of a cow from a holding pen to a milking pen and illustrating the gate disposition for the capture of the cow to the milking pen and disposition of the cow's right rear quarter to the worker for attachment of the teat cup; and FIG. 3 is a view similar to FIG. 2 illustrating the backing of a cow within a medial loading pen to a medial milking pen illustrating specifically the temporary interruption of the separate entrance the gate disposition between the holding pen.

FIGS. 4A-4G are a cartoon sequence in respective plan views illustrating the preferred sequence for milking—with a series of three such stalls being illustrated.

Referring to FIG. 1 a plan view of the arrangement of this invention is illustrated. Holding pens H1 through H10 are each disposed off of an entrance path E.

Likewise, milking pens M1 through M10 are each disposed off of an exit path X. Entrance path E runs adjacent the entrance to the front loading holding pens H1–H10. Similarly exit path X runs immediately adjacent the milking pens M1–M10.

Milking pens M1–M10 are disposed at an appropriate 45° angle with respect to exit path X. Holding pens H1–H10 are disposed at a 45° angle with respect to entrance path E. The corresponding holding pen H1–H10 overlie a milking pen M1–M10. That is to say pen H1 is in direct alignment with milking pen M1. Holding pen H2 is in direct alignment with milking pen M2, etc.

The pen includes a series of wands W. First, wands Wh monitor the presence of an animal within a holding pen H. Each holding pen H1–H10 includes a wand Wh.

Each milking pen includes a wand Wm. Milking pen wands Wm monitor the departure of an animal from the milking pen. Additionally, they monitor the rear progress of a backing wall (illustrated herein with respect to FIG. 2 and described in my prior art patent entitled Automated Elevated Back-in Milking Barn U.S. Pat. No. 3,536,045 issued Oct. 27, 1970).

Finally, an exit wand Wx monitors the exit of a cow from the exit path. Likewise, an entrance wand We monitors the entrance of a cow to the entrance path We.

The wands are known in the prior art and specifically are set forth in my above-referenced prior art patent. Specifically, the wands are depending semi-rigid members which contact the cow in the vicinity of the horns and body as the cow moves across the wand. There emits an electrical signal upon a cow passing the wand device. Contact is usually made in the vicinity of the horns.

Having described the configuration of the pens and the location of the wands and the separate entrance and exit paths, a detail of the gate structure will now be set forth.

Referring to FIGS. 1 and 2, and with emphasis on FIG. 2, each holding pen includes a holding pen rear gate Gh. It can be seen that when gate Gh to a discrete holding pen H1-H10 is open, a cow is diverted to the holding pen from the entrance path E. See gate Gh on holding pen H10 open for diverting a cow into holding pen H10. Likewise, when the rear gate Gh is open, the cow can be backed out of the holding pen. See gate Gh on holding pen H1 open for backing a cow into milking pen M1. The reader will understand that this backing process will be more completely described hereafter.

Each pen has immediately behind the pen and dividing the entrance path E from the exit path X a gate Ge and a gate Gx. When the gates Ge and Gx overlap one another they separate the entrance path E from the exit path X. When the gates are in the open disposition (see holding pen H1 and milking pen M1 in FIG. 2) these gates defines sides of a path across the entrance path E in the case of gate Ge and exit path X in the case of gate Gx.

Finally, and at the entrance to each milking pen, there is defined a gate Gm. Gate Gm typically includes a feeding stall 14 at the middle portion thereof. Gate Gm when closed captures a cow within the milking pen M10 as shown in FIG. 1 and provides distracting feed. Gate Gm when open permits exit of a cow from milking pen M1 to the exit path X.

A permanent barrier B prevents entrance of the unmilked herd from corral 16 to the exit path X. Likewise, a return path R at barrier 18 returns unmilked cows not finding a holding pen H1-H10 to the unmilked herd area 16. As can be seen, cows discharged from the exit path X join the milked herd in corral 20.

Having understood from FIGS. 1 and 2 the general disposition of the component parts of this invention, reference may now be made with respect to FIG. 2 to illustrate the backing of a cow from holding pen H1 into milking pen M1. It will be understood that all backings are similarly effected.

It will be seen with respect to FIG. 1 that when the milked cow in milking pen M1 exits, wand Wm will be activated. Typically, the animal will depart exit path X and its total exit from the apparatus herein will be monitored at wand Wx.

Upon appropriate monitoring of such exit, and presuming that a cow is in holding pen H1, gate Gm will remain in the open position. Gates Gx and Ge will move from their parallel position to open positions with gate Ge extending across entrance path E and gate Gx extending across exit path X. Finally, gate Gh at the rear of holding pen H1 will open.

It will be seen that for gates Ge and Gh across the exit E and Gm and Gx across the exit path X define a single linear pen including holding pen H1 at the top, milking pen M1 at the bottom and the gate; the pens being in direct alignment.

Typically, a cow C in holding pen H1 will be backed by a moving wall 30 attached to an overhead track 32. I have disclosed such a moving wall 30 and track 32 in my above-referenced U.S. patent.

I have found that animals are easily backed when confronted by a slowly moving mechanical wall. In fact, such animals typically move in anticipation of such wall movement and readily back themselves in a gentle and safe manner as soon as the wall starts to move. Specifically, the animals are usually completely backed long before complete wall movement occurs.

Typically, the complete rearward movement of the animal into the milking pen will be monitored by wand Wm. When wand Wm detects complete rearward movement of wall 30, gate Gm will close capturing the cow in the milking pen. Wall 30 will return to the end of stall H1. Gates Ge and Gx will return to their overlapped, parallel disposition. Gate Gh will remain in the open position until wand Wh detects the presence of a cow in the holding pen H1. Such presence is encouraged by the placement of feed at the far or head end of the respective holding pens. It thus is understood how loaded cows back from the holding pen H1 to the milking pen M1.

The reader will realize that the rear quarters of the cows are disposed for milking. Specifically, an operator will work from milking pen M1 to milking pen M10. In such working he will attach teat cups (not shown) to the bag of each cow. Typically, the teat cups will milk the cow until the flow of milk ceases. Thereafter, the teat cups will remotely drop from the bag of the cow causing gate Gm to open with the sequence herein set forth occurring.

Finally, and with respect to FIG. 3, the effect of a cow backing from holding pin H6 to milking pin M6 is shown upon a cow C1 exiting exit path X and a cow C2 proceeding in entrance path E. It will be seen that the open gate Gm obstructs exit path X. Similarly, any cow on entrance path E will be blocked by gate Ge. Such blocking will only be temporary until backing is completed. Once backing is completed and the gates returned to their normal position, the monitored cow flow will continue.

The present invention lends itself to sequential gate manipulation. Specifically, and in initiating cow flow, pens H1 through H10 will be loaded in sequence. Thereafter milking pens M1-M2 will be backed in sequence. Finally as each milking pen empties a cow from an overlying holding pen will be loaded. Once a cow is loaded, normal herd flow will effect loading of the empty holding pen.

Utilizing FIGS. 4A-4G, a typical operating sequence can be Illustrated. As will be apparent to the reader in following this description, the illustrated sequence readily lends itself to control by computer.

Figure 4A:
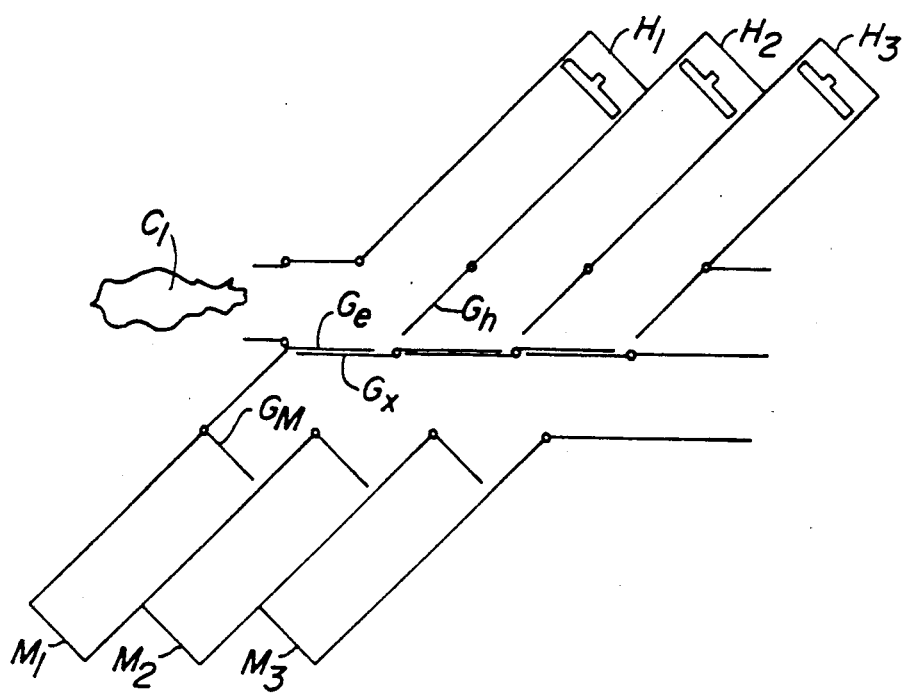
Figure 4B:
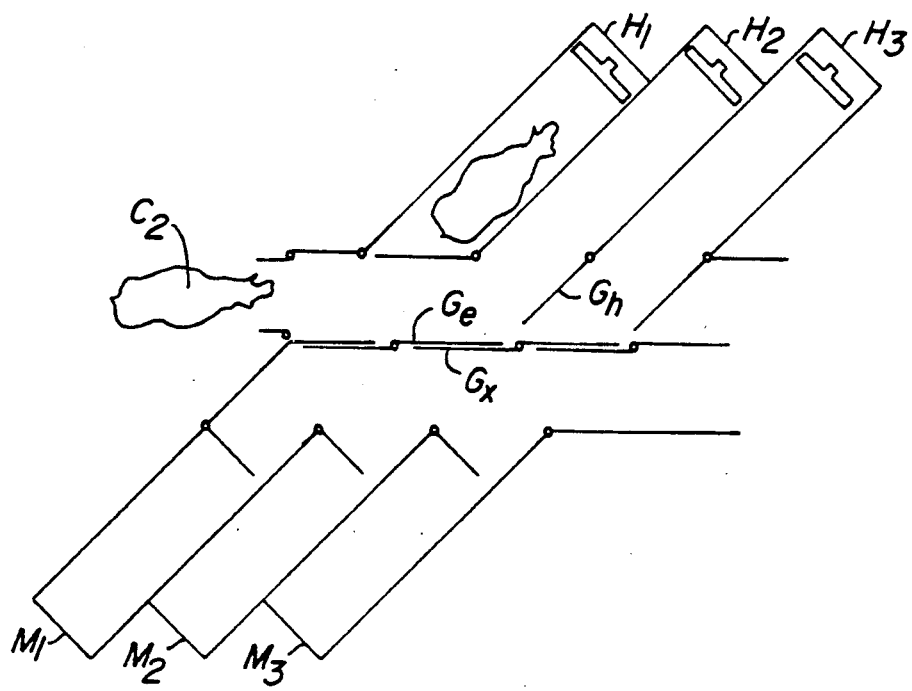
Figure 4C:
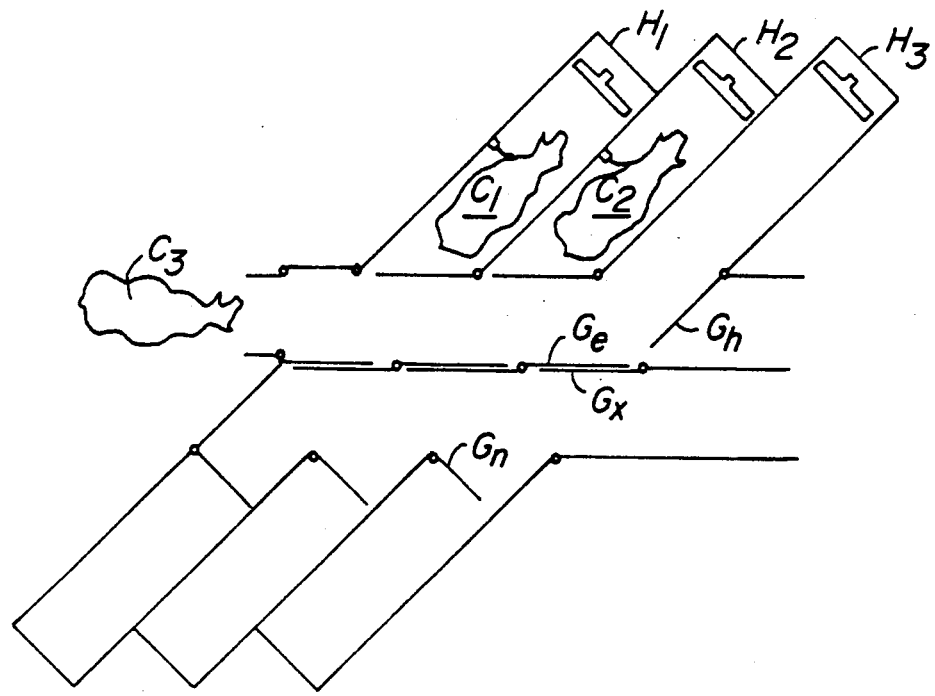

Referring to FIGS. 4A, 4B, and 4C, the sequence of the initial loading of the pens is illustrated with the respective cows C1, C2, and C3. In these respective views, pens H1-H3 are all loaded with cows for milking.

Figure 4D:
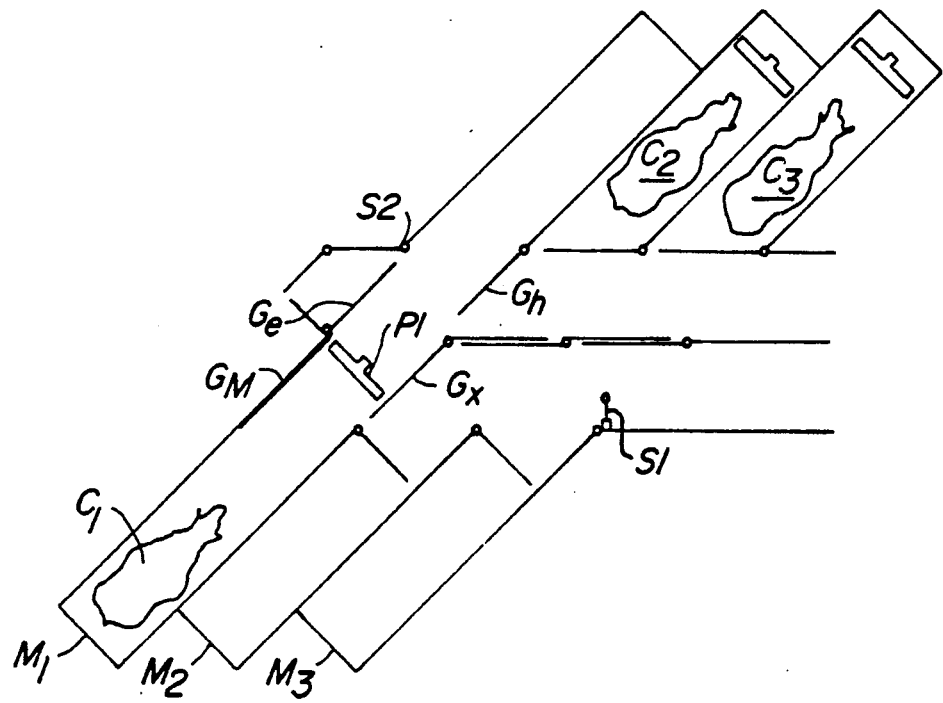

Referring to FIG. 4D, the initial loading of milking stall M1 is illustrated with cow C1. Specifically gates Ge and Gx open to define portions of the cross backing path required. Similarly, gates Gh and Gm open to define the remainder of the cross backing path. There results a path that wall 30 can effect the backing of the animal in holding stall H1 to milking stall M1. When the cow is in position, attachment of the teat cup assembly conventionally occurs.

Figure 4E:
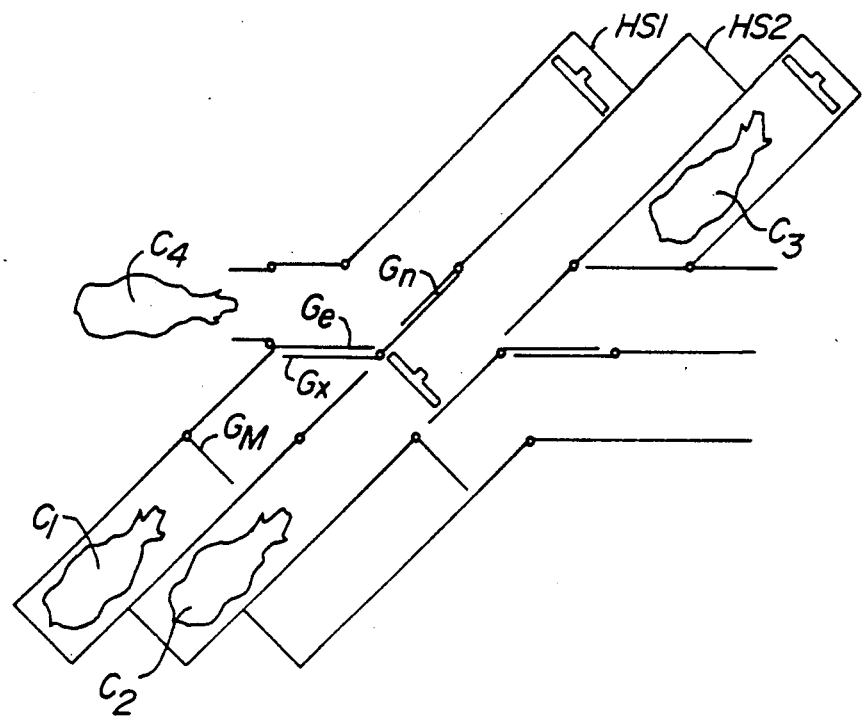

Referring to FIG. 4E, the pen sequence is illustrated with the respective milking stall M1 loaded with cow C1 and milking stall M2 being loaded with cow C2, and with the gates aligned for the simultaneous loading of cow C4 into holding pen H1. It will be observed that the loading of the animal C2 into milking pen M2 is in the process of being completed.

Figure 4F:
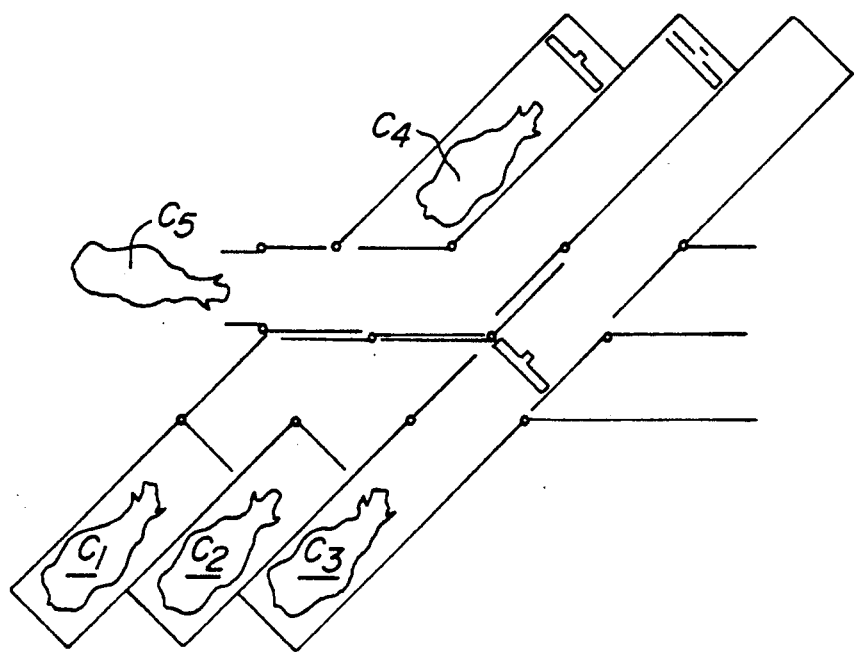

Referring to FIG. 4F, it can be seen that the loading of loading pen H2 is taking place with cow C5. At the same time, the loading of cow C4 to be milked in pen M3 is just being completed. It will be understood that the sequence is beginning to repeat itself.

At this point, an important observation can be made relative to the movement of the operator. Specifically, operator movement has been indicated by a vector 0. Operator movement is initially required on a left to right pattern. This left to right pattern continues in the three stall example shown herein in FIGS. 4A-4G or in the 10 stall configuration shown in FIGS. 1-3. Further, and where one cows holds over in a stall—a common occurrence because different cows require different times for milking—this left to right sequence of the operator movement will continue. Consequently, the efficiency of the dual path embodiment extends not only to the movement of the cows—but to the movement of the operator as well.

Figure 4G:
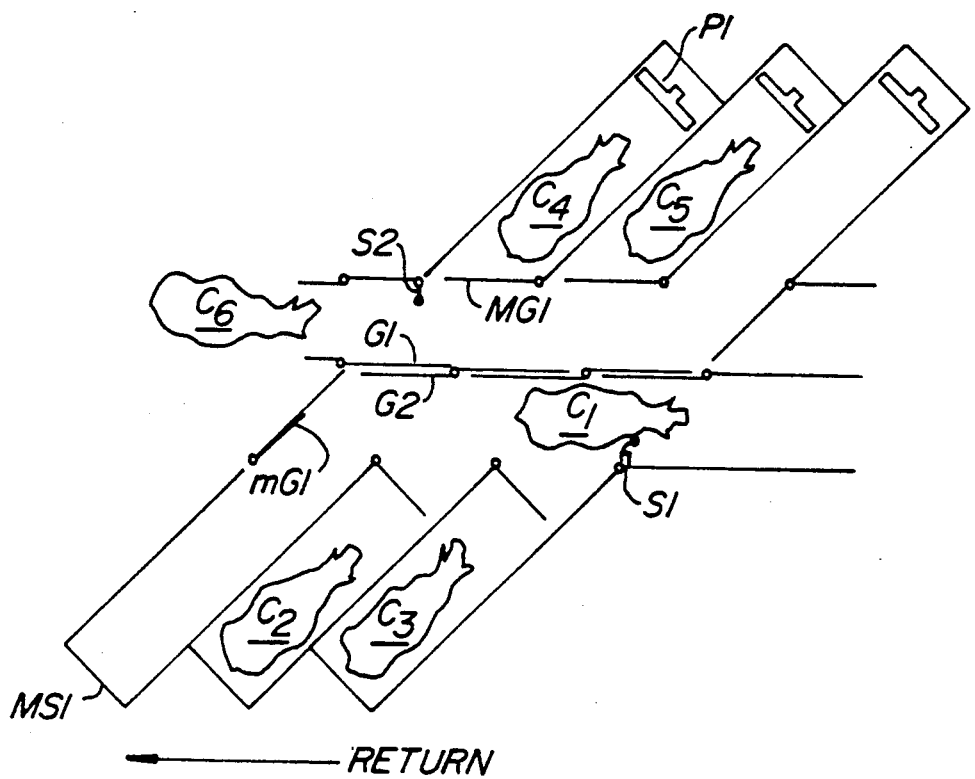

Referring to FIG. 4G, the final cartoon illustrates the simultaneous loading of holding pen H3 with cow C6 with a discharge of a milked animal C1 from milking pen M1. When this occurs, six animals circulating between three holding pens and three milking pens will occur. As can be seen, the respective cows travel along entrance path E and exit path X. At the same time, the return of the operator to milking pen M1 is illustrated at vector R.

An advantage not immediately apparent is present. In the milking pen that I have designed, the worker or operator never confronts or otherwise herds the cow.

It is common practice in the dairy industry to change operators frequently. Unfortunately, cows are intelligent enough to recognize and be frightened by frequent operator replacement. The pen arrangement proposed here has the advantage of permitting such operator replacement without the herd ever being aware that replacement has occurred. Thus the self-herding pen of my invention has the added advantage of permitting change of operators without interfering with the desired cow flow.

What is claimed is:

1. In a milking barn wherein milking stalls are disposed at an angle to a cow entrance/exit path, an improved stall configuration comprising:
   an entrance path;
   a plurality of holding pens disposed in side-by-side relation angularly diverging from said entrance path for receiving and holding cows to be milked;
   an exit path parallel to said entrance path;
   a corresponding plurality of milking stalls to each said holding stalls, said milking stalls longitudinally aligned for rear loading, one said milking stall behind each said holding stall for permitting a cow backed from said holding stall to be received in said milking stall along a straight path;
   a holding stall gate disposed for confining a received animal in said each holding stall in the closed position and blocking said entrance path in the open position to divert a cow to said holding stall;
   a milking stall gate configured to confine a cow in each said milking stall in the closed position and to extend across said exit path in the opened position to permit a milked cow to pass from said milking stall to said exit path;
   and second overlapping gates for dividing said entrance path and said exit path in the overlapped position;
   one of said gates extending across the entrance path and one of said gates extending across the exit path to form backing pen sidewalls in the open position to allow a cow to be backed from said holding pen to said milking pen.

2. The invention of claim 1 and further including:
   a cow return path, said path disposed for leading unmilked animals from an exit of said entrance path to the entrance of said entrance path to provide a return loop for unmilked animals.

3. The invention of claim 1 and further including at least three holding stalls and at least three milking stalls.

4. A process of milking a herd of animals comprising the steps of:
   providing an entrance path;
   providing a plurality of holding pens disposed in side-by-side relation angularly diverging from said entrance path for receiving and holding cows to be milked;
   providing an exit path parallel to and side-by-side to said entrance path;
   providing a corresponding plurality of milking stalls longitudinally aligned to each said holding stalls, each said milkinq stall behind a corresponding holding stall for permitting a cow to be backed from said holding stall to said milking stall along a straight path across said entrance and exit paths;
   providing a holding stall gate for holding an animal in said holding stall in the closed position and extending across said entrance path for diverting an animal into said holding stall in the open position;
   providing a milking stall gate for holding an animal in said milking stall in the closed position and for extending across said exit path in the open position for defining an exit path for an animal in the open position;
   providing first and second overlapping gates dividing said entrance path from said exit path, said respective first and second gates dividing said paths in the closed positions and defining side walls to a backing path between said holding pen and said milking pen in the open position;
   sequentially opening and closing holding pen gates sequentially for the loading of said holding pens;
   sequentially opening said holding pen gates, said milking pen gates and said first and second gates for permitting an animal in said holding pen to be backed from said holding pen to said milking pen across said entrance and exit paths; and,
   sequentially opening said milking pen gates to discharge to said exit path milked animals from said milking pens.

5. The process of claim 4 and wherein the step of sequentially opening and closing said holding pen gates and the step of sequentially opening said holding pen gates, said milking pen gates and said first and second gates occur simultaneously.

6. The process of claim 4 and wherein the step of sequentially opening and closing said holding pen gates and opening and closing said milking pen gates occurs simultaneously.

7. The process of claim 4 and wherein said step of opening and closing said holding pen gates, said milking pen gates and said first and second gates for permitting an animal in said holding pen to be backed from said holding pen to said milking pen across said entrance and exit path and said opening and closing of said milking pen gates occurs simultaneously.

* * * * *